United States Patent
Haykal et al.

(10) Patent No.: US 9,917,879 B2
(45) Date of Patent: Mar. 13, 2018

(54) REMOTE INTERFACE TEMPLATES (71) Applicant: MICROSOFT CORPORATION, Redmond, WA (US)

(72) Inventors: Salem Elie Haykal, Bellevue, WA (US); Jay Ongg, Redmond, WA (US); Radu Bacioiu, Kirkland, WA (US); Li Xu, Bellevue, WA (US); Janine Michelle Perret, Mercer Island, WA (US); Phoi Heng Lew, Mill Creek, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 565 days.

(21) Appl. No.: 13/739,789

(22) Filed: Jan. 11, 2013

(65) Prior Publication Data

US 2014/0108503 A1    Apr. 17, 2014

Related U.S. Application Data

(60) Provisional application No. 61/713,509, filed on Oct. 13, 2012.

(51) Int. Cl.
*G06F 9/44* (2006.01)
*H04L 29/08* (2006.01)
(Continued)

(52) U.S. Cl.
CPC ............ *H04L 67/02* (2013.01); *G06F 9/4443* (2013.01); *G06F 17/30861* (2013.01); *G06F 8/36* (2013.01); *G06F 8/65* (2013.01)

(58) Field of Classification Search
CPC . H04L 67/02; G06F 9/4443; G06F 17/30861; G06F 8/36; G06F 8/65
See application file for complete search history.

(56) References Cited

U.S. PATENT DOCUMENTS

| 8,166,023 B2 | 4/2012 | Melcher et al. |
| 2008/0195664 A1 | 8/2008 | Maharajh et al. |

(Continued)

FOREIGN PATENT DOCUMENTS

| WO | 99/52032 A1 | 10/1999 |
| WO | 2009/120599 A2 | 10/2009 |

OTHER PUBLICATIONS

"International Search Report & Written Opinion for PCT Application No. PCT/US2013/064730", dated Mar. 12, 2014, Filed Date: Oct. 12, 2013, 11 Pages.

(Continued)

*Primary Examiner* — Oanh Duong
(74) *Attorney, Agent, or Firm* — Shook, Hardy and Bacon L.L.P.

(57) ABSTRACT

Embodiments of the present invention allow applications developers to change user experiences within an application without updating the application by relying on remote interface templates to create user experiences. The application code includes entry points to various remote interface templates stored on a remote device. The remote interface templates are consumed by the application to render content blocks that are all, or part of, the application's interface. The remote interface templates may be changed seamlessly at the remote device allowing the user to enjoy the updated interface without interruption the next time the application is opened.

20 Claims, 9 Drawing Sheets

(51) Int. Cl.
*G06F 17/30* (2006.01)
*G06F 9/445* (2018.01)

(56) References Cited

U.S. PATENT DOCUMENTS

| | | | |
|---|---|---|---|
| 2009/0037961 A1* | 2/2009 | Green et al. | 725/87 |
| 2009/0063995 A1* | 3/2009 | Baron et al. | 715/753 |
| 2010/0267376 A1* | 10/2010 | Saari et al. | 455/418 |
| 2010/0319009 A1* | 12/2010 | Chafer | H04L 67/02 |
| | | | 719/328 |
| 2011/0216179 A1 | 9/2011 | Dialameh et al. | |
| 2011/0237031 A1 | 9/2011 | Yato et al. | |
| 2012/0092345 A1 | 4/2012 | Joshi et al. | |
| 2012/0159314 A1 | 6/2012 | Schrier et al. | |
| 2012/0179958 A1* | 7/2012 | Tarjan | 715/234 |
| 2012/0304052 A1* | 11/2012 | Tanaka et al. | 715/243 |
| 2013/0305144 A1* | 11/2013 | Jackson et al. | 715/246 |
| 2014/0046980 A1* | 2/2014 | Kleinschmidt et al. | 707/793 |

OTHER PUBLICATIONS

Pano Logic "Pano Virtual Client for Cloud"; Sep. 27, 2012; 1 page; http://www.panologic.com/pano-virtual-client/cloud.
Pano Logic "Pano System for Cloud"; Sep. 27, 2012; 2 pages; http://www.panologic.com/data/fe/file/downloads/data-sheets/PanoLogic_DS_Pano_System_Cloud_DS-PSC-082912.pdf.

* cited by examiner

REMOTE INTERFACE TEMPLATES

CROSS-REFERENCE TO RELATED DOCUMENTS

This application claims the benefit of priority to U.S. Provisional Application No. 61/713,509, filed Oct. 13, 2012, and titled "Remote Interface Templates", the entirety of which is hereby incorporated by reference.

BACKGROUND

Currently, a new version of an application needs to be installed on the client device when an application developer wants to change a user experience for the application. Application updates may be pushed to an application and automatically installed. In other cases, the user may be notified that the application needs to be updated and the user can follow instructions to download and install an updated version of the application. Frequently downloading application updates to change the user experience can frustrate a user and cause them to be less enthusiastic about the application.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention allow applications developers to change user experiences within an application without updating the application by relying on remote interface templates to create user experiences. The application code includes entry points to various remote interface templates stored on a remote device. The remote interface templates are consumed by the application to render content blocks that are all, or part of, the application's interface. The remote interface templates may be changed seamlessly at the remote device allowing the user to enjoy the updated interface without interruption the next time the application is opened.

Regardless of the devices involved, the templates on the remote computing device are readily accessible and updatable by application developers. The remote interface templates define the content and appearance of a content block. A user interface may comprise a single content block or multiple content blocks. When multiple content blocks are involved with a user interface, then multiple remote interface templates may be used to generate a single user interface.

In addition to receiving interface templates, which are used to generate content blocks forming a user interface, the client applications may collect and transmit user analytics back to a remote computing device to help developers understand how various templates are received by users. For example, the client application may track dwell time, clicks, and other interaction metrics with user interfaces built using the remote interface templates. The analytics may be specific to a particular remote interface template within an interface built using multiple remote interface templates.

BRIEF DESCRIPTION OF THE DRAWINGS

Embodiments of the invention are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention allow applications developers to change user experiences within an application without updating the application by relying on remote interface templates to create user experiences. The application code includes entry points to various remote interface templates stored on a remote device. The remote interface templates are consumed by the application to render content blocks that form all, or part of, the application's interface. The remote interface templates may be updated seamlessly at the remote device, which allows the user to enjoy the updated interface without interruption the next time the application is opened.

For example, a sports application may have an entry point for a "happening now" user experience associated with current sporting events. This experience may change based on what is current and appear in a single content block forming part of the application user interface. For example, during the Olympics, updated medal counts may be displayed as part of the user experience. The remote template defines the medal count format and display characteristics for the content block. The content, in this case the medal count, could be embedded in the remote template, in which case the remote template would require frequent updates as the medal count changed. The content could also be retrieved from a data feed using instructions within the template and then displayed according to the format in the template. When the Olympics are over, the user experience may change to display results from an ongoing tennis match, golf tournament, or other current sporting event. The application developer may want to change not only the content, but the look and feel of the user experience on a per-sport basis and may do this by changing the remote template.

Embodiments of the present invention provide the remote templates to an application running on a client device. For example, the application could be running on a smart phone, slate, game console, or personal computer. The remote computing device could be a server accessed over the Internet or other network connection. In another example, a game console could act as the remote computing device and store templates that are accessed by a slate, smart phone, or other device connected to the game console over a local area network, such as a WiFi network.

Regardless of the devices involved, the templates on the remote computing device are readily accessible and updatable by application developers. The remote interface templates define the content and appearance of a content block. A user interface may comprise a single content block or multiple content blocks. When multiple content blocks are involved with a user interface, then multiple remote interface templates may be used to generate a single user interface.

The application running on the client is not a web browser and the remote interface templates are not web pages. The remote interface templates may include links to web pages or other content that may be accessed from other remote devices, but the remote interface template itself is not a web page. Rather, the remote interface template integrates into the application running on the client and as such can take advantage of client side resources that the application has access to. Thus, instead of needing to update the application, developers can simply update the remote interface templates to create a new experience.

The developers may have access to a group of templates that can be selected and purposed for use as a specific remote interface template. The templates may work across multiple applications while being customized by developers for the specific user experience they are trying to create within a particular application.

In addition to receiving interface templates that are used to generate content blocks forming a user interface, the client applications may collect and transmit user analytics back to the remote computing device to help developers understand how various templates are received by users. For example, the client application may track dwell time, clicks, and other interaction metrics with user interfaces built using the remote interface templates. The analytics may be specific to a particular remote interface template within an interface built using multiple remote interface templates.

Having briefly described an overview of embodiments of the invention, an exemplary operating environment suitable for use in implementing embodiments of the invention is described below.

Exemplary Operating Environment

Figure 1:
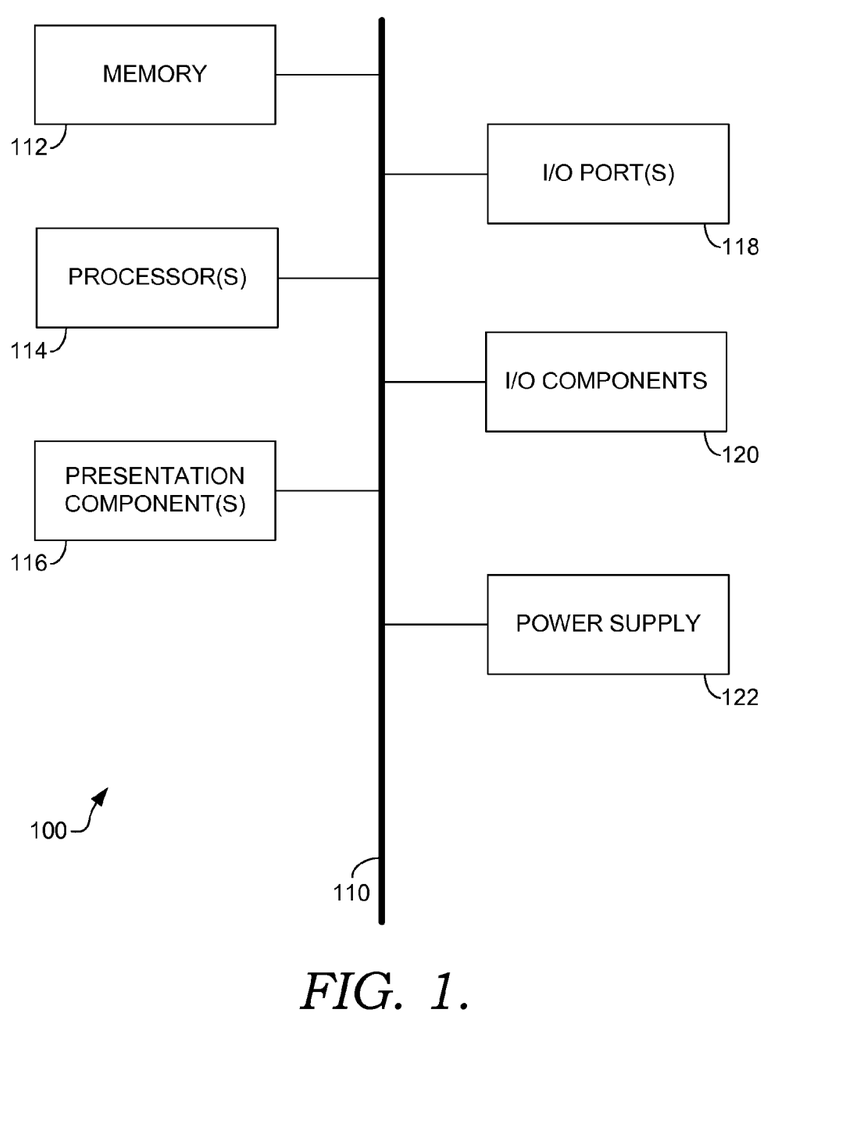
FIG. 1 is a block diagram of an exemplary computing environment suitable for implementing embodiments of the invention.

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary Remote Computing Environment

Figure 2:
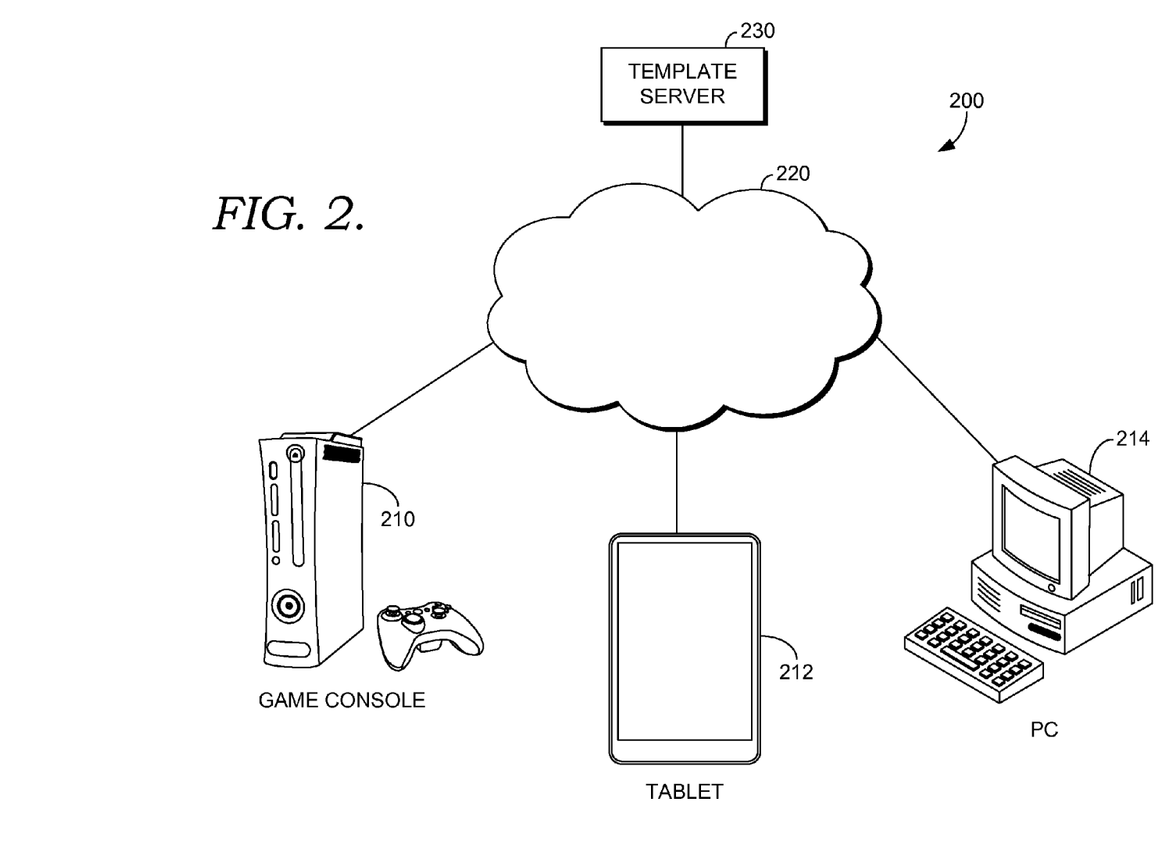
FIG. 2 is a diagram of remote computing environment, in accordance with an embodiment of the present invention.

Turning now to FIG. 2, a remote computing environment 200 is shown, in accordance with an embodiment of the present invention. The remote computing environment 200 comprises various client devices connected through a network 220 to a remote template server 230. Exemplary clients include a game console 210, a slate or tablet 212, and a personal computer 214. Use of other clients, such as smart phones and GPS devices, are also possible. The game console 210 may have one or more game controllers communicatively coupled to it that may also provide user interfaces generated using remote templates. In one embodiment, the tablet 212 may act as an input device for a game console 210 or a personal computer 214, while running the same application simultaneously. In another embodiment, the tablet 212 is a stand-alone application client. Network 220 may be a wide area network, such as the Internet. In one embodiment, remote templates are pushed to the game console or PC and then to a connected device.

The template server 230 stores published remote templates that may be communicated to a client device. A communication session between the template server 230 and clients carries input traffic to the template server 230 and returns templates. Developers may publish to the template server and templates may have unique identification that allows them to be retrieved through the entry points.

Template server 230 may comprise multiple computing devices communicatively coupled to each other. In one embodiment, the template server 230 is implemented using one or more server farms. The server farms may be spread out across various geographic regions including cities throughout the world. In this scenario, the clients may connect to the closest server farms. Embodiments of the present invention are not limited to this setup.

Exemplary Remote Application Template

Figure 3:
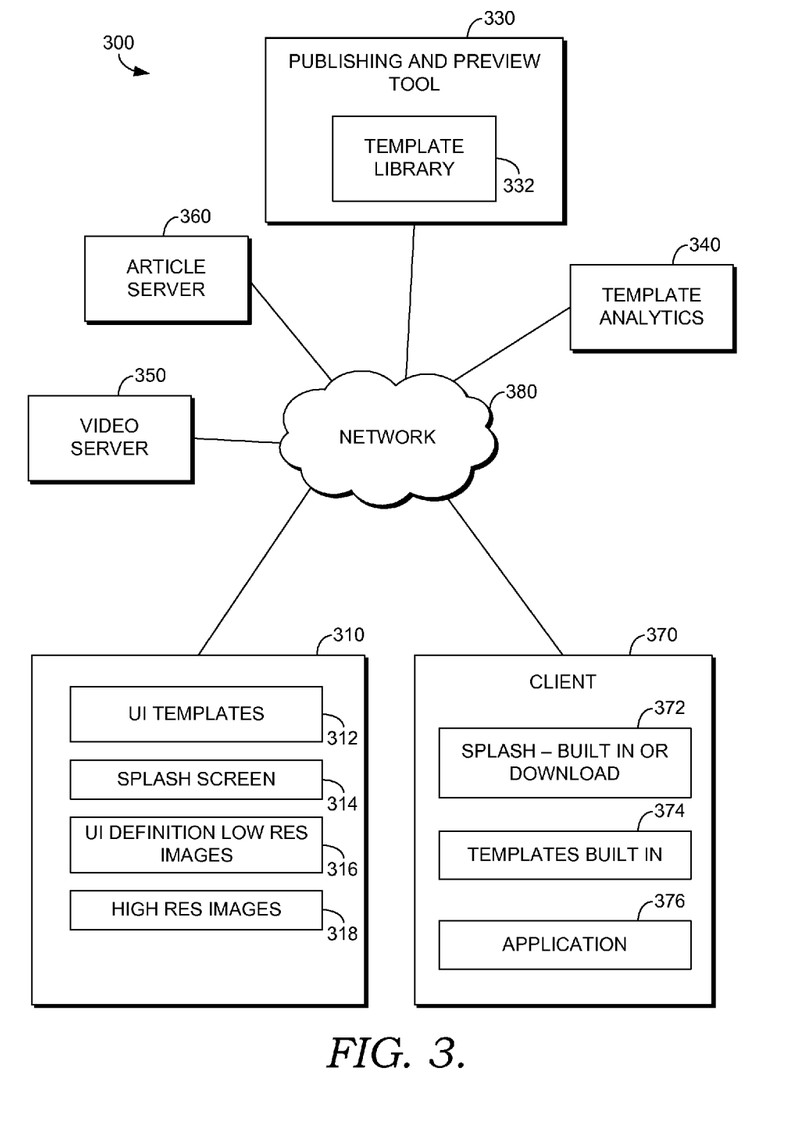
FIG. 3 is a diagram of a remote interface template environment, in accordance with an embodiment of the present invention.

Turning now to FIG. 3, a block diagram of a computing environment 300 illustrating exemplary components of a remote interface template system is shown, in accordance with an embodiment of the present invention. The exemplary components include a published templates server 310, a publishing and preview tool 330, a template analytics component 340, a video server 350, an article server 360, a client device 370, and network 380. Network 380 communicatively couples various components. An exemplary network 380 could be the Internet. Computing environment 300 is merely an example of one suitable architecture and is not intended to suggest any limitation as to the scope of the use or functionality of the present invention. Neither should the computing environment 300 be interpreted as having any dependency or requirement related to any single component or combination of components illustrated therein.

The template server 310 stores and communicates published remote interface templates to client applications. The published templates may be generated through use of publishing and preview tool 330. The template server 310 may include more than just published templates. For example, the template server 310 may also store content associated with the templates, as will be explained subsequently. The template server 310 may include published interface templates for a particular entity, multiple entities, and for multiple applications. In the alternative, the template server 310 could be dedicated to a particular entity or application. The template server 310 may act as a centralized service that is used by multiple entities.

The remote-interface template store 312 stores published templates. Though shown as a single block, the template server 310 may comprise multiple template stores. For example, each application could have a designated template store 312. The templates are used to generate content blocks, which will be described in more detail subsequently with reference to FIGS. 4 and 6. A content block may include pictures, texts, video, links, all within a designated format. Once published, the remote templates can be updated and republished. Each template in template store 312 has a unique way to identify the template. The template server 310 may use a directory of template store 312 to retrieve templates requested by applications.

Template server 310 is remote from the client device 370. Template server 310 is also shown as remote from the publishing and preview tool 330, as well, as the template analytics component 340. While the client 370 is always remote from the template server 310, the other components shown could be co-located on the same computing device or affiliated computing devices, such as those in a server farm.

The template server 310 also has a splash screen store 314. A splash screen may be a rendered image. The splash screens may be downloaded by the client device 370 and shown to the user while the content block generated from the remote template is being rendered. As mentioned, the splash screen store 314 does not need to be stored in template server 310. This is one implementation strategy that can also allow for easily updatable splash screens, for example, with advertising information. However, splash screens could also be stored on the client and periodically updated.

Template server 310 may also include images used to build content blocks. Low resolution image store 316 and high resolution image store 318 store low and high resolution images, respectively. Low resolution images may be accessed or linked within the remote templates and retrieved by the client when rendering a content block. The low resolution images and high resolution images may portray the same images. A determination may be made whether the high resolution image is used to render a content block based on factors such as available bandwidth. In one embodiment, initially low resolution images are rendered and then replaced with high resolution images.

The publishing and preview tool 330 is used to generate and publish templates that may be accessed by a remote application to generate a content block. Initially, developers may access templates from template library 332. The templates are pre-formatted to run with various applications. A template interface may be displayed to developers from which templates may be selected.

Figure 5:
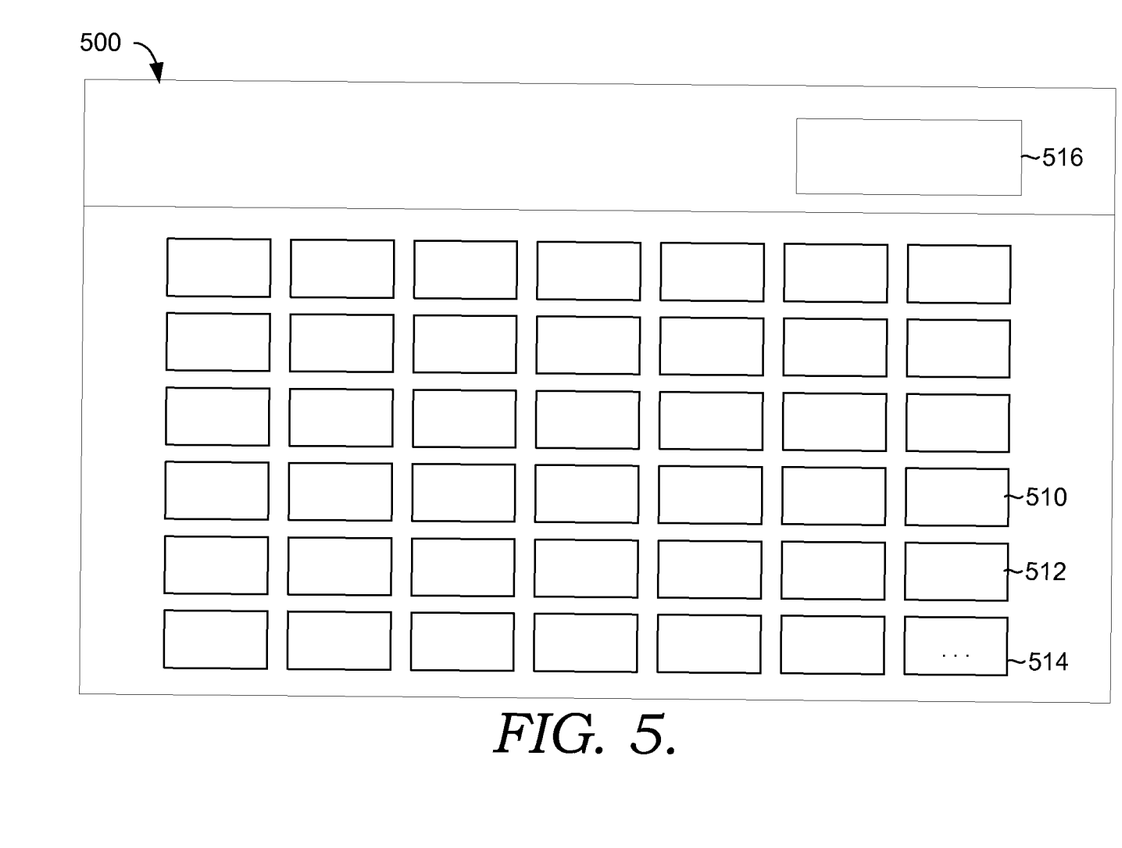
FIG. 5 is a diagram showing a template library, in accordance with an embodiment of the present invention.

FIG. 5 shows an exemplary template library interface 500. As can be seen, various template thumbnails 510, 512, and 514 are shown. The developer may select one of the templates and then modify it to suit their purposes. In one embodiment, the developer is able to drag the selected template into box 516. In response, a template detail interface (not shown) may be opened. The developer is able specify the template characteristics and ultimately publish the modified template. As can be seen, a large number of customizable templates may be provided, each with different content options.

Figure 4:
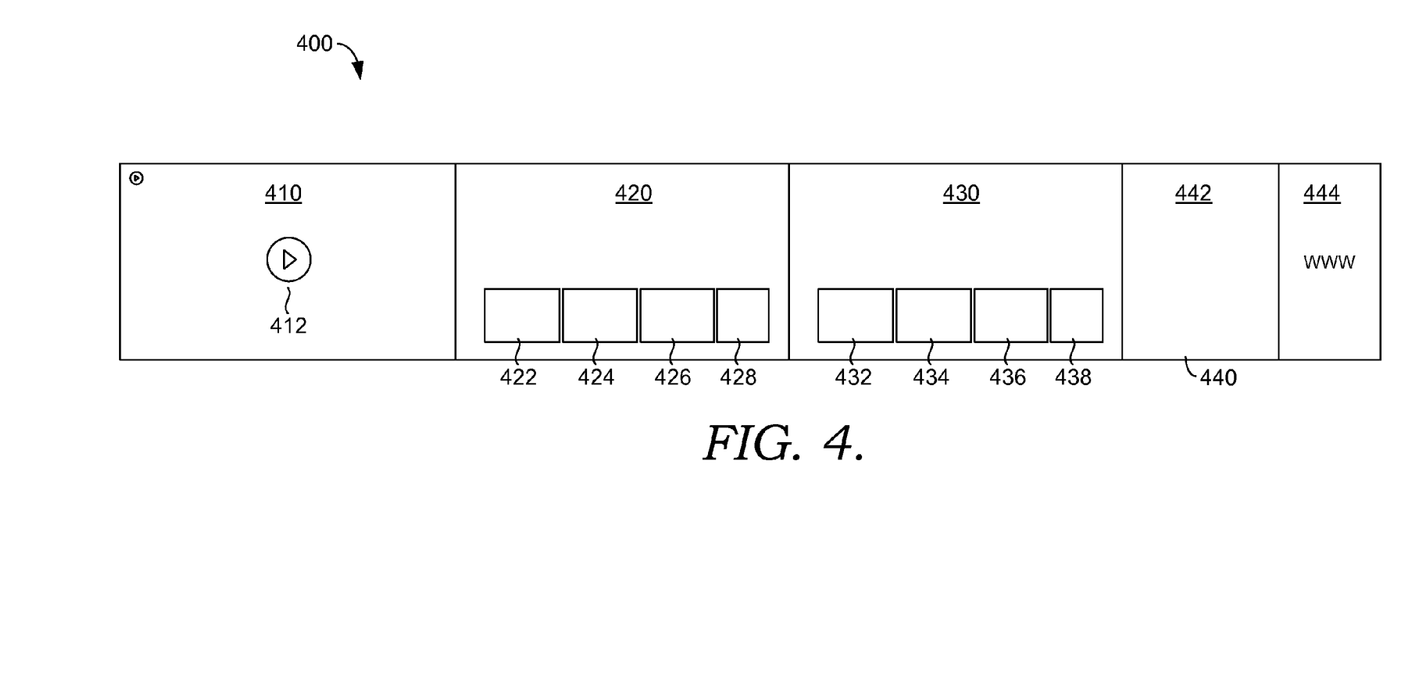
FIG. 4 is a diagram showing remote interface templates, in accordance with an embodiment of the present invention.

FIG. 4 illustrates several exemplary remote interface templates 400, in accordance with an embodiment of the present invention. These templates are unpublished and ready to be modified by a developer. The templates include template 410, template 420, template 430, and template 440. Template 410 includes video controls 412 and may be linked to a video that plays in response to the embedded controls. In one embodiment, the content block rendered from a published template based on template 410 includes a play button shown beneath a thumbnail of an image taken from the linked video. Template 420 and template 430 both include places where various images can be inserted. Template 420 includes image insertion blocks 422, 424, 426, and 428. Template 430 includes image insertion points 432, 434, 436, and 438. In addition to the image insertion points, the templates may be customized by selecting background colors, wallpapers, inserting text, specifying fonts, and other appearance characteristics of the templates. Template 440 includes a display area for text 442 and a URL linking area 444.

Returning now to FIG. 3, the publishing and preview tool 330 allows the developer to customize various templates. Once customized the templates may be published to a central template server 310 or to a template server designated by the developer. As mentioned, template servers may be developer or application specific or one or more common template servers may be shared by various applications and developers. In one embodiment, a central template server is used for security purposes. The preview tool allows the developer to see what the content block rendered from a published template will look like.

The article server 360 and the video server 350 are two examples of content servers that may be linked within customized user interface templates. For example, clicking on a movie link may cause a movie to be retrieved from the video server 350. Similarly, clicking on a link to an article may cause an article or other content to be retrieved from the article server 360.

The template analytics component 340 receives instrumentation or analytical data from the client 370. The application that is using the remote templates to generate an interface gathers user interaction data, including click tracking and dwell time on the content block generated by the template. In this way, template performance can be monitored and improved. In one embodiment, the template analytics component 340 allows performance information for a template to be aggregated across multiple applications and developers. In another embodiment, the template analytics component 340 allows developers to keep their analytic data private.

The client 370 is a computing device capable of running applications and rendering graphical user interfaces that may be output for display on a display device. The display device may be integrated within the client 370 in some cases. Exemplary client devices 370 include a game console, a slate, a personal computer, and a smart phone. The client 370 includes a built-in splash 372 and built-in templates 374. Both the built-in splash 372 and built-in template 374 may work with application 376. In some embodiments, the user interfaces may be a hybrid of templates retrieved from the template server 310 with local templates. In one embodiment, templates are periodically retrieved from the remote computing device and cached on the client 370. Updated templates may be saved and the old templates deleted when received. The application 376 is not a web browser. The application 376 provides one or more user experiences and user interfaces. While only a single application 376 is shown, the client 370 may have multiple applications installed.

Figure 6:
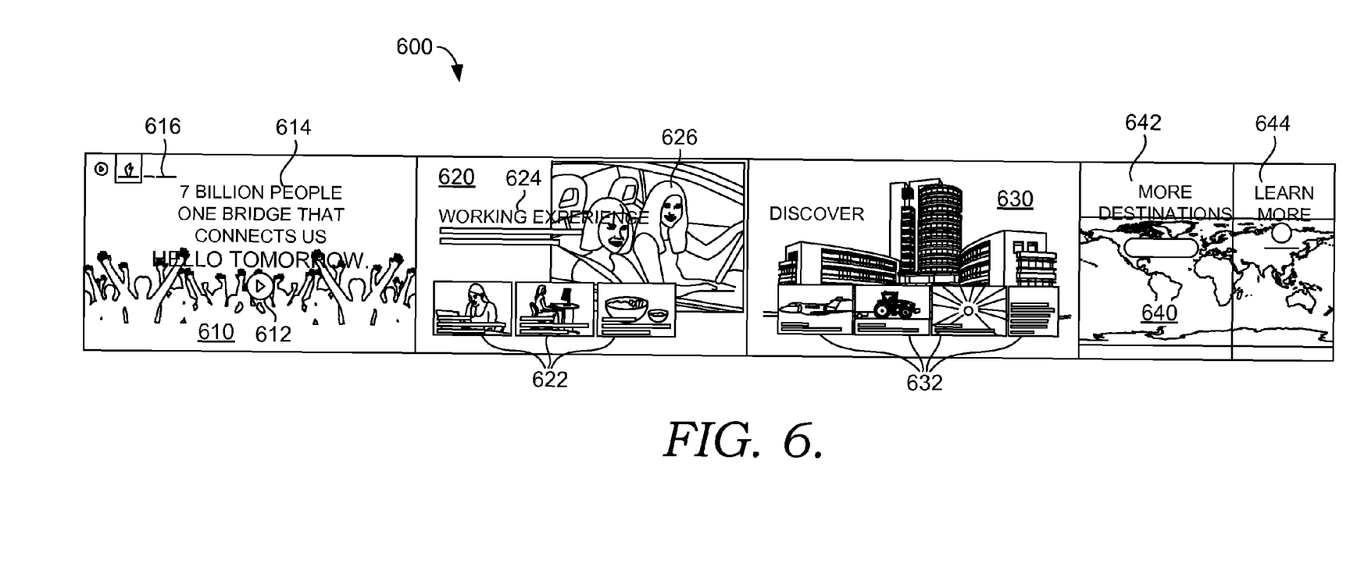
FIG. 6 is a diagram showing rendered content boxes generated using remote interface templates, in accordance with an embodiment of the present invention.

Turning now to FIG. 6, a rendered user interface built using remote interface templates is shown, in accordance with an embodiment of the present invention. The rendered interface includes content blocks 610, content block 620, content block 630, and content block 640. Each of these content blocks correspond with a user interface template shown in FIG. 4. The content blocks are generated by combining content with the remote templates. In some cases, content may be drawn from other remote computing devices through a remote connection. For example, images or videos may be displayed within a content block after retrieval from a content server. On the other hand, images shown on the various content blocks may be integrated into the template. For example, images such as images 622, 626, and 632 may be integrated into the template and downloaded to the client device along with, or as part of, the remote template.

Text such as text 614, 624, 642, 644, and other text shown may also be part of the template, along with background colors and fonts. As can be seen, the content blocks may be a different size. Content block 610 includes a video link 612 and a navigation button 616. For example, content block 620 and 630 are larger than content block 640. The content blocks may be combined to form a single interface or part of an interface. The content blocks may be combined with other interface features that are generated or stored locally by the application. Further, in some embodiments a particular application does not consume the entire display area of a user interface. In this case, the application may generate a user interface that comprises only part of the overall screen real estate available to the client device.

Figure 7:
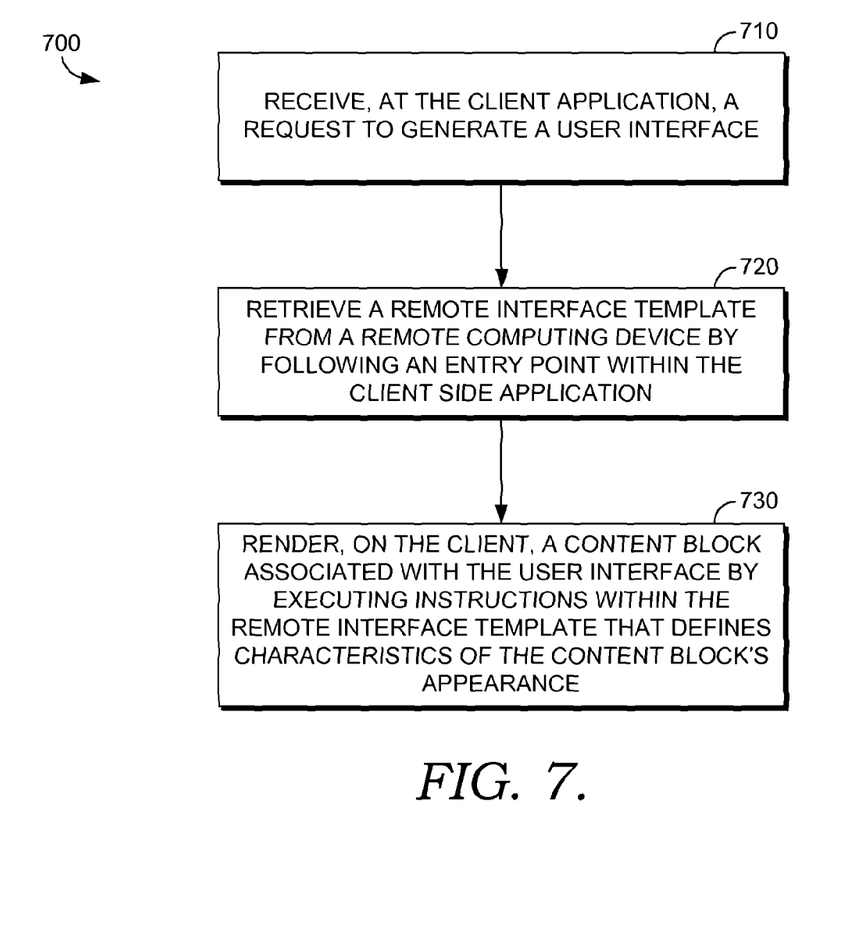
FIG. 7 is a flow chart showing a method of generating a user interface for an application running on a client device, in accordance with an embodiment of the present invention.

Turning now to FIG. 7, a method 700 of generating a user interface for an application running on a client device is shown, in accordance with an embodiment of the present invention. The method comprises receiving 710, at the client application, a request to generate a user interface. The client application is not a web browser. The method also comprises, retrieving 720 a remote interface template from a remote computing device by following an entry point within the client application. The method also comprises rendering 730, on the client, a user-interface content block associated with the user interface by executing instructions within the remote interface template that define appearance characteristics of the user-interface content block.

Figure 8:
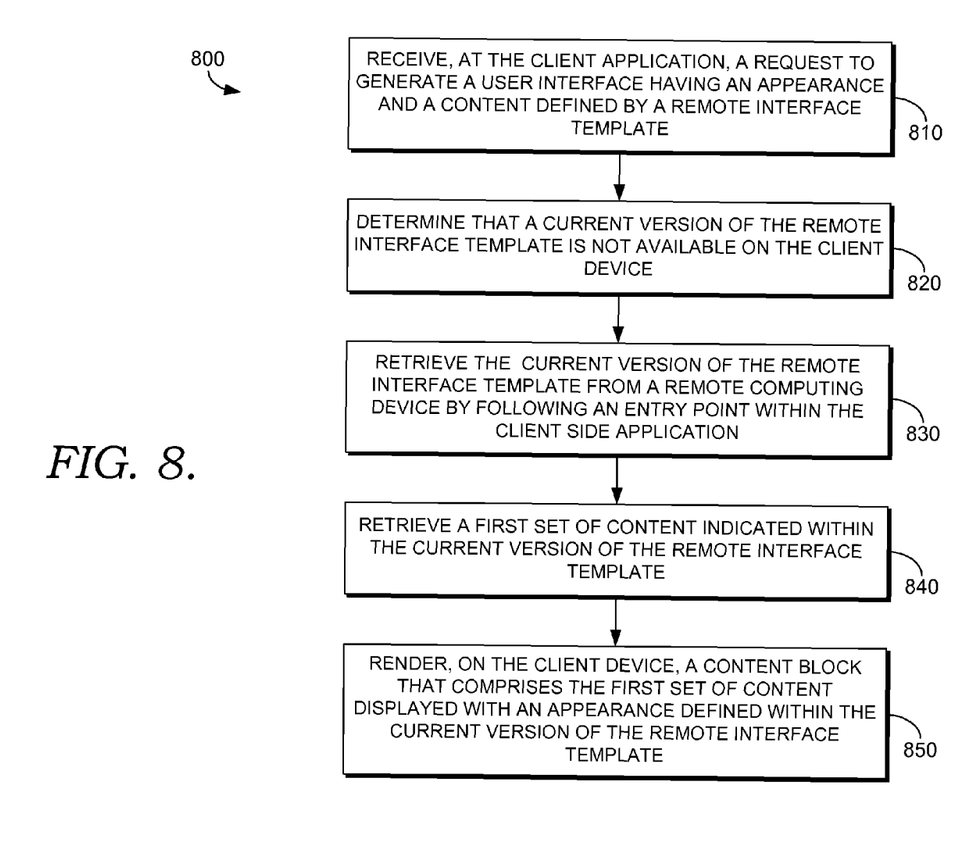
FIG. 8 is a flow chart showing a method of generating a user interface for an application running on a client device, in accordance with an embodiment of the present invention.

Turning now to FIG. 8, a method 800 of generating a user interface for an application running on a client device is shown, in accordance with an embodiment of the present invention. The client device may be a personal computer, slate, smart phone, or other computing device. The client device has one or more mechanisms for communicating with other computer devices over a network.

At step 810, a request to generate a user interface having an appearance and a content defined by a remote interface template is received at the client application. The client application is not a web browser. In one embodiment, the request is generated automatically upon opening the client application. In another embodiment, the request is received in response to a user selecting a feature within the application.

As mentioned, an individual remote interface template may be used to generate multiple user interfaces. A single user interface may include multiple content blocks each generated using a designated remote interface template. A user interface may have multiple content blocks generated with the same remote interface template, but combined with different content. Alternatively, an interface could be built using different remote interface templates for different content blocks within the interface. A content block generated by a remote interface template may have a link that opens a new interface generated using the same or different remote interface templates.

At step 820, a current version of the remote interface template is determined to not be available on the client device. By determining that a current version of the designated remote interface template is not available on the client device, it could be that no version of the designated remote interface is available or that only an outdated one is available. In one embodiment, remote interface templates are stored on the client device for use building user interfaces. However, the remote interface templates may become stale and require an update. In one embodiment, a stored remote interface template is determined to be stale, and therefore not the current version, after a designated amount of time passes. For example, a remote interface template that has been stored for more than one week may be presumed to be stale. In another embodiment, interface templates that are not used within a designated amount of time are deleted. In another embodiment, a prefetching regime is used to periodically check for new remote interface templates and update the local cache as needed. In one embodiment, the client application communicates with a remote interface template server and compares version information for the requested template to determine whether a locally stored template is the current version.

At step 830, the current version of the remote interface template is retrieved from a remote computing device by following an entry point within the client side application. The remote interface template may be designated through a protocol handler or entry point within the application. The entry point may designate a remote interface template using an identification key that uniquely identifies the interface template. The remote interface template may be designated by a key that can be used to retrieve the template locally or remotely. Upon determining that the requested template is not available locally, the entry point may further include instructions indicating how the remote interface template may be retrieved. Instructions may designate a server or other remote location where the remote interface template is stored.

At step 840, a first set of content indicated within the current version of the remote interface template is retrieved. The content may be retrieved from a separate source or entity than the remote interface template. The content could include advertising content, news content, or other information.

At step 850, a content block that comprises the first set of content displayed with an appearance defined within the current version of the remote interface template is rendered on the client device. The rendered content block may form part of a user interface or be the entire user interface. The rendered content block may be output for display to the user.

In one embodiment, user interactions with the content block are tracked and communicated to an analytic's service that compiles user interaction data for the remote templates and related content across multiple users and client devices. Because different content is combined with the same remote interface template to create different interfaces, the performance of the content may be separated from the performance of the interface by aggregating response information from multiple users, interfaces, and applications.

Figure 9:
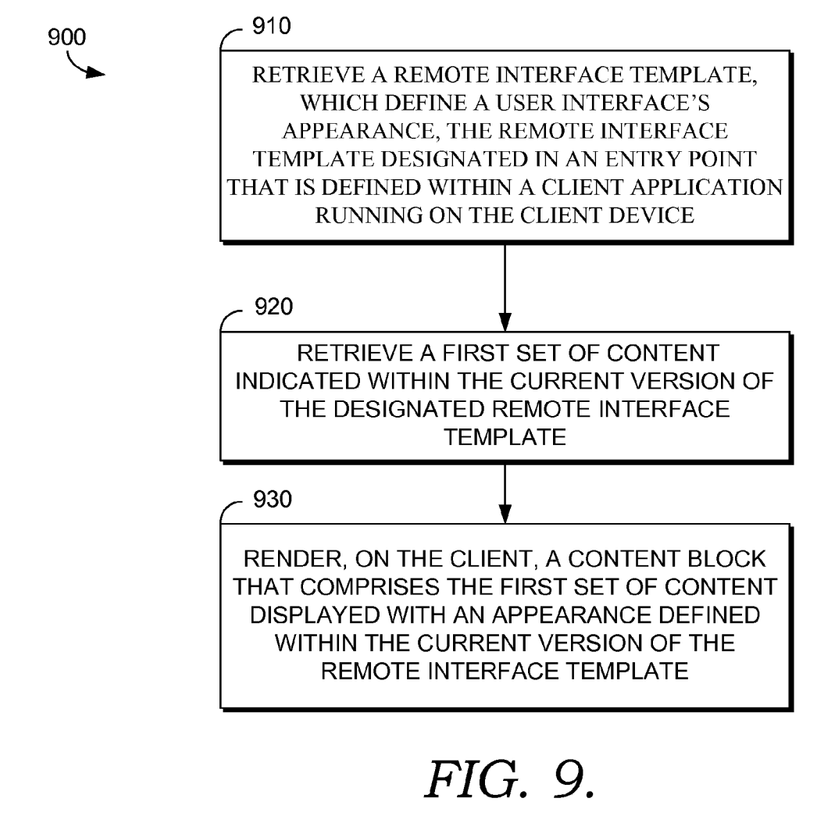
FIG. 9 is a flow chart showing a method of generating a user interface for an application running on a client device, in accordance with an embodiment of the present invention.

Turning now to FIG. 9, a method 900 of generating a user interface for an application running on a client device is shown, in accordance with an embodiment of the present invention. At step 910, a remote interface template, which defines a user interface's appearance, is retrieved. The remote interface is designated in an entry point that is defined within a client application running on the client device.

At step 920, a first set of content indicated within the current version of the designated remote interface template is retrieved. As mentioned, the content may be retrieved from a different entity or location than from where the remote interface template was retrieved. In another embodiment, the content in the remote interface template are retrieved from the same entity.

At step 930, a content block is rendered on the client device. The content block comprises the first set of content displayed with an appearance defined within the current version of the remote interface template.

Embodiments of the invention have been described to be illustrative rather than restrictive. It will be understood that certain features and sub-combinations are of utility and may be employed without reference to other features and sub-combinations. This is contemplated by and is within the scope of the claims.

The invention claimed is:

1. One or more computer-storage media having computer-executable instructions embodied thereon that when executed by a computing device perform a method of generating a user interface for a client application running on a client device, the method comprising:
   receiving, at the client application running on the client device, a request to generate the user interface for the client application, the client application not being a web browser, wherein the client application comprises client application code that includes an entry point to a remote interface template;
   retrieving, via a network connection with a remote template server, the remote interface template from the remote template server by following the entry point within the client application code, wherein the entry point within the client application code identifies the remote interface template for retrieval; and
   rendering, on the client device, a content block associated with the user interface by executing instructions within the remote interface template that define appearance characteristics of a first set of content within the content block.

2. The media of claim 1, wherein the appearance characteristics comprise an arrangement of the first set of content within the content block.

3. The media of claim 1, wherein the user interface comprises multiple content blocks each defined by a different remote interface template.

4. The media of claim 1, wherein the content block comprises a link to a different interface that is generated using the remote interface template combined with a second set of content.

5. The media of claim 1, wherein the method further comprises tracking user interactions with the content block and communicating interaction information describing the user interactions to an analytics service that aggregates interaction information from multiple client devices.

6. The media of claim 1, wherein the method further comprises periodically determining whether an updated version of the remote interface template is available.

7. A system for generating a user interface for a client application, which includes client application code, running on a client device, comprising:
one or more computing devices that operate to:
A) receive, at the client application, a request to generate the user interface having an appearance and a content defined by a remote interface template,
B) determine that a current version of the remote interface template is not available on the client device,
C) retrieve the current version of the remote interface template from a remote computing device by following an entry point within the client application code, wherein the entry point within the client application code identifies the remote interface template for retrieval,
D) retrieve a first set of content indicated within the current version of the remote interface template, and
E) cause rendering, on the client device, of a content block that comprises the first set of content displayed with the appearance defined within the current version of the remote interface template.

8. The system of claim 7, wherein the first set of content and the current version of the remote interface template are retrieved from different online entities.

9. The system of claim 7, wherein the first set of content comprises text and a video.

10. The system of claim 7, wherein the first set of content comprises a link to an different interface generated by a different application running on the client device, wherein the different application operates to use the current version of the remote interface template to generate the different interface.

11. The system of claim 7, wherein the one or more computing devices further operate to track user interactions with the content block and communicate interaction information that describes the user interactions to an analytics service that aggregates interaction information from multiple client devices.

12. The system of claim 11, wherein the user interactions comprise one or more of dwell time and click tracing.

13. The system of claim 11, wherein the one or more computing devices further operate to analyze user interactions on the client device across multiple sets of content presented in content blocks built using different remote interface templates to determine a set of remote interface templates that are associated with desired user responses.

14. The system of claim 13, wherein the one or more computing devices further operate to preferentially use the set of remote interface templates to build content blocks on the client device.

15. A method of generating a user interface for a client application, which includes client application code, running on a client device, the method comprising:
retrieving a remote interface template, which defines a user interface's appearance, the remote interface template designated in an entry point that is defined within the client application code, wherein the entry point within the client application code designates a remote server where the remote interface template is stored;
retrieving a first set of content indicated within the remote interface template; and
causing rendering, on the client device, of a content block that comprises the first set of content displayed with an appearance defined within the remote interface template.

16. The method of claim 15, wherein the method further comprises retrieving a new version of the remote interface template at designated intervals and replacing a cached version of the remote interface template when the new version is available.

17. The method of claim 15, wherein the first set of content comprises a link to a different interface generated by a different application running on the client device, the different application using the remote interface template to generate the different interface.

18. The method of claim 15, wherein the client application is not a web browser.

19. The method of claim 15, wherein the method further comprises communicating user interactions on the client device across multiple sets of content presented in content blocks built using different remote interface templates to an analytics service.

20. The method of claim 15, wherein the user interface comprises multiple content blocks each defined by a different remote interface template.

* * * * *